April 6, 1965  P. FORD ETAL  3,177,280
PROCESS FOR THE MANUFACTURE OF POLYURETHANE COATED BALLS
Filed May 23, 1961  2 Sheets-Sheet 2
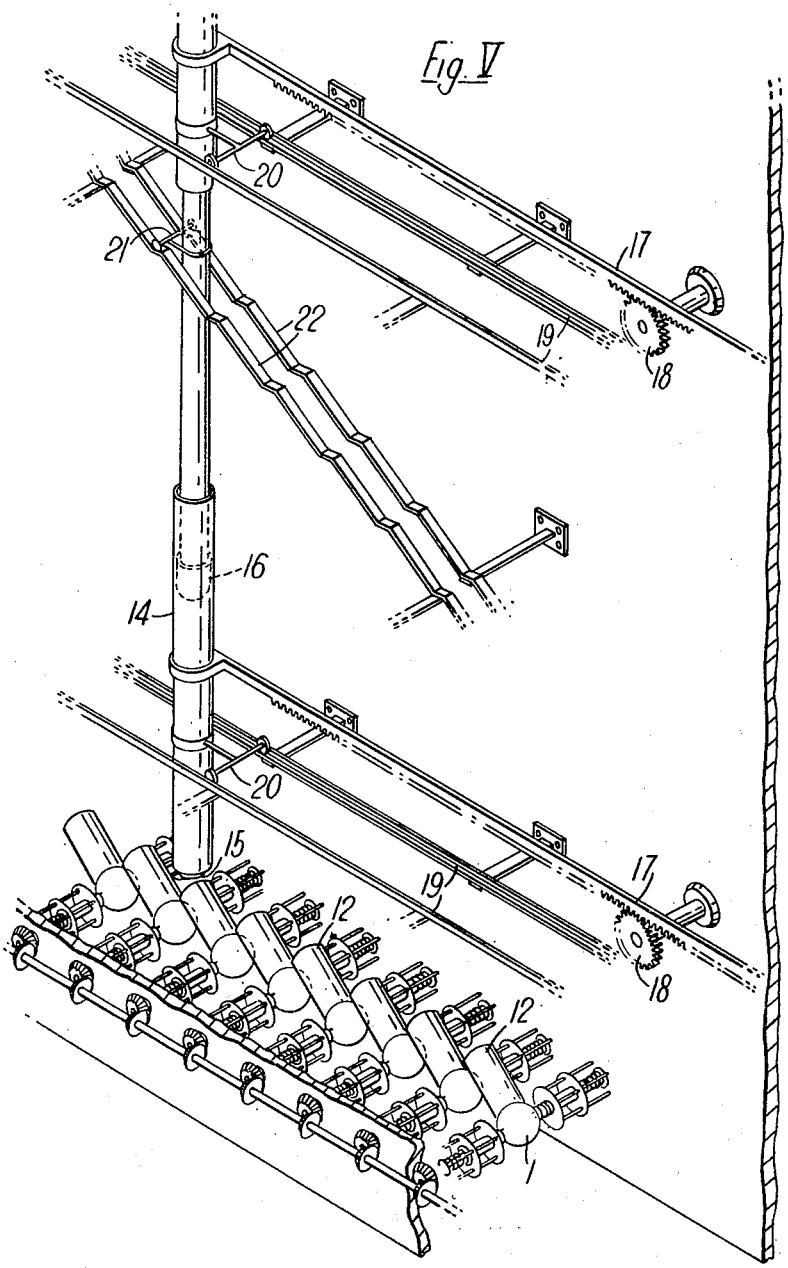
Inventors
PETER FORD
JOHN WILLIAM WATSON
ROGER JAMES OTTEWELL
BY Bacon & Thomas Attorneys United States Patent Office 3,177,280
Patented Apr. 6, 1965

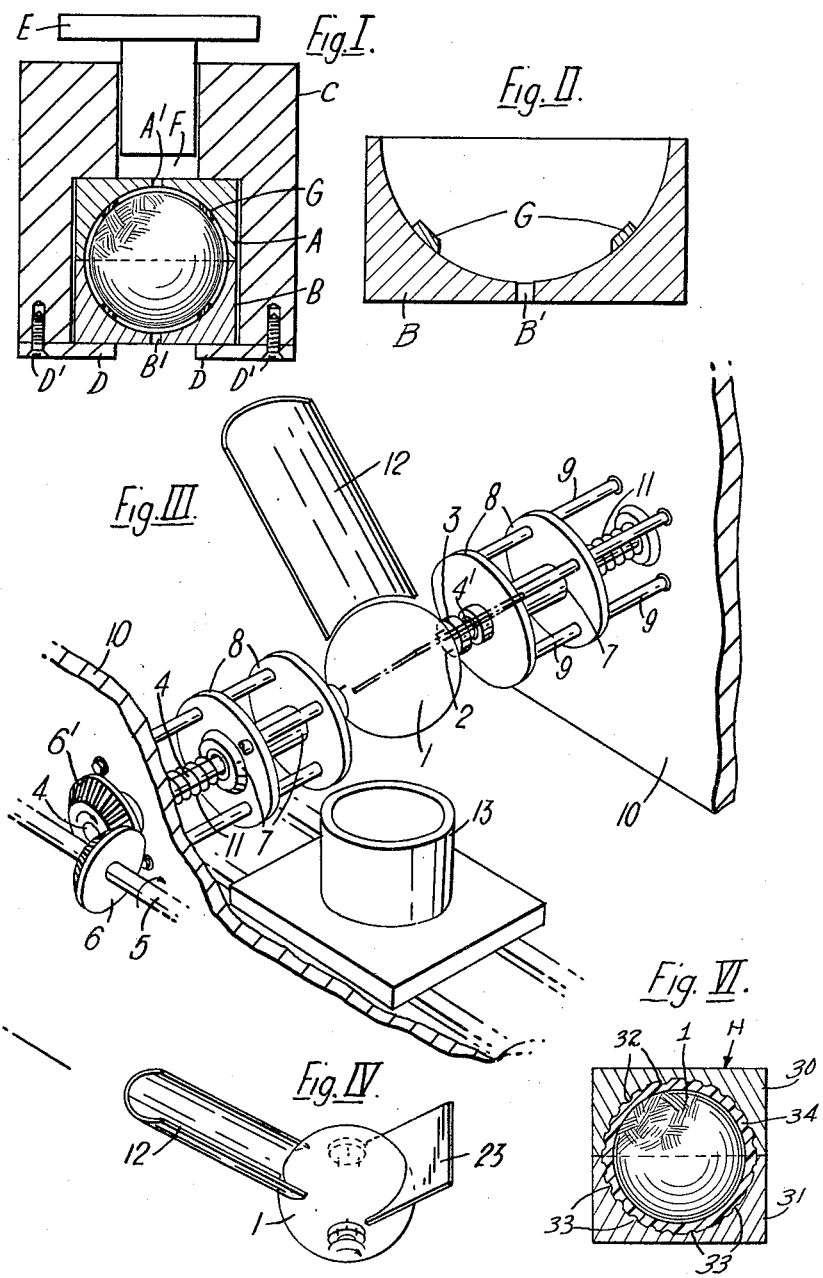

3,177,280
PROCESS FOR THE MANUFACTURE OF POLY-
URETHANE COATED BALLS
Peter Ford, John William Watson, and Roger James
Ottewell, all of Erdington, Birmingham, England,
assignors to Dunlop Rubber Company Limited, London,
England, a British company
Filed May 23, 1961, Ser. No. 112,007
Claims priority, application Great Britain, May 23, 1960,
18,129/60
3 Claims. (Cl. 264—275)

This invention is concerned with improvements in or relating to the manufacture of balls, particularly golf balls.

Conventional golf balls consist of a core of vulcanized rubber thread wound round a suitable center and encased in a cover consisting essentially of gutta percha. Gutta percha is an expensive material and attempts have been made to manufacture golf balls having covers of material other than gutta percha. One of the difficulties in using other materials lies in the use of the existing procedure for applying the cover to the core, whatever may be the nature of the latter. This procedure comprises pre-moulding the cover in two half-shells, positioning the core between the two shells and finally heating the assembly under pressure in a suitable mould to cause the edges of the half-shells to fuse together and to impress the desired pattern on the surface of the ball. When one attempts to apply this procedure to half-shells formed from a polyurethane one frequently encounters the difficulty of being unable satisfactorily to fuse the half-shells together in the final moulding stage, i.e. failure is liable to occur at the junction of the two half-shells.

It will be appreciated that when manufacturing golf balls from gutta percha the latter is in the uncured state during both moulding stages, the crystallinity of the gutta percha rendering it solid at room temperature and plastic at moulding temperatures. When using polyurethanes, on the other hand, it is advisable to cure the polymer in order to obtain favourable physical properties. In consequence the polyurethane changes from a thermoplastic to a non-thermoplastic state and this gives rise to difficulty during moulding, particularly during the fusion of the half-shells.

It is an object of the invention to provide an alternative method for the manufacture of cored balls, particularly golf balls, having a polyurethane cover, i.e. a method which does not involve the manufacture of half-shells and is consequently free from the difficulties arising from this method.

We have now found that it is possible to coat a previously prepared core with a curable polyurethane cover, e.g. by directly moulding or by coating, and form a patterned ball therefrom if the cover is first applied in an unpatterned form, the curing of the polyurethane is then interrupted and the final cure and patterning of the ball is effected in a mould specifically for this purpose.

This invention will be particularly described with reference to golf balls but it is to be understood that it is not limited thereto.

According to the invention, therefore, there is provided a process for the manufacture of balls, particularly golf balls, which comprise supporting a preformed ball core (for example of vulcanized rubber thread or of polyurethane thread), if desired in a mould, forming an integral, unpatterned, solid cover thereon of a partially-cured, but still substantially thermoplastic, polyurethane from a curable polyurethane pre-polymer, transferring the coated core to a ball mould provided with a patterned moulding surface and moulding the coated core to a patterned ball therein while advancing the cure of the polyurethane to a substantially non-thermoplastic state.

Depending on the nature of the polyurethane pre-polymer and the conditions of application, it may or may not be necessary to first heat the polyurethane during formation of the cover and likewise it may or may not be necessary to employ forced cooling of the covered core to inhibit further curing of the polyurethane and also, if necessary, to solidify the polyurethane if at the desired state of thermoplasticity it is still not sufficiently solid to be handled without damage.

The term "polyurethane pre-polymer" is used herein for convenience to distinguish the starting material from the cured polyurethane in the golf ball cover. However, it will be understood that the polyurethane pre-polymer is itself a polymer and not merely an intermediate therefor. The polyurethane pre-polymer is preferably a viscous liquid at or somewhat above room temperature. In general we prefer, for convenience in handling, to use liquid polyurethane prepolymers. The production of polyurethane pre-polymers is well known. Generally, they are prepared by reacting an organic polymer containing hydroxyl groups with an organic polyisocyanate or polyisothiocyanate. Examples of such organic polymers include polyesters, polyethers, and polyesteramides, all of which must, however, contain residual isocyanate reactive hydroxyl groups. Examples of suitable polyesters include polyethylene glycol adipate, polyethylene glycol sebacate, polypropylene glycol adipate and also copolyesters. Examples of suitable polyethers include polyglycols from propylene oxide and tetrahydrofuran. The process according to the invention is particularly suited to polyethers prepared from tetrahydrofuran but is not limited thereto. Polyisocyanates which may be used include naphthalene diisocyanate, tolylene diisocyanate and diphenyl methane diisocyanate. Polyurethane pre-polymers which may be used include Adiprene L.167 a commercially available pre-polymer made from polytetrahydrofuran and tolylene diisocyanate.

Curing is preferably effected by means of a cross-linking agent e.g. a substance containing at least two active hydrogen atoms per molecule, e.g. diols, diamines, etc., but water is preferably not used as a cross-linking agent since, as is known, it reacts with terminal isocyanate groups to evolve carbon dioxide; this is undesirable if a good finish is to be obtained on the golf ball cover.

The polyurethane pre-polymer/cross-linking agent mixture may be used alone or may be admixed with other materials, for example, mineral oils, fillers and colouring materials.

In one method (Method A) of carrying out the process according to the invention, a previously prepared golf ball core is positioned in a mould provided with supports for centrally positioning the core in the mould, and curable polyurethane is moulded around the core, conveniently by injection moulding, curing of the polyurethane is interrupted and the covered core is transferred to a patterned golf ball mould wherein moulding and curing are completed as described above. In this method we prefer to apply a thin coating to the core before positioning it in the mould to assist in centrally positioning the core in the mould. (It will be appreciated that in the absence of this coating due to the unevenness of the surface of a golf ball core wound in the normal manner it is difficult to ensure that the core is accurately located in the center of the mould if conventional locating pins are used.) The thin coating may, for example, be deposited from a mobile, cold setting polyurethane pre-polymer composition e.g. while slowly rotating the core, preferably about its horizontal axis.

Alternatively, or in addition to using a thin coating, instead of using locating pins in the mould one can use wedge-shaped supports, the edges of which are sufficiently long to bridge the gap between two adjacent thread windings on the surface of the core. The length of the edge may be from 2 mm. to 6.5 mm. The edges need not be knife edges but can conveniently be flat-edged to give more support to the core in the mould. It will be appreciated that whether pins, wedges or other supports are used the surface area of these in contact with the core and cover should be as small as possible to avoid subsequent flaws in the golf ball after the final moulding step.

Prior to applying the cover (or even the thin pre-coating) to the core it is advantageous first to "seal" the core to prevent unwinding of the thread thereon and also to prevent excessive penetration of polyurethane pre-polymer into the core. This may conveniently be achieved by dipping the core in a prevulcanized rubber latex, removing the core therefrom and drying the coating e.g. in a stream of warm air.

In one embodiment of Method A a polyurethane prepolymer, particularly one derived from a polyether e.g. polytetrahydrofuran, is injection moulded as discussed above, curing is interrupted by cooling the shell while still in a plastic state to a temperature below the freezing point of the shell and then moulding of the cover is completed in a patterned golf ball mould, the covered core being placed in the latter while it is still in a frozen state. Provided that the shell is not cooled to such a low temperature that it becomes brittle, the frozen covered core can be handled without risk of substantial damage and can be stored for some time (under insulated conditions) without undue risk of premature curing.

While, in this embodiment, we prefer to accelerate the partial cure by heating, e.g. at about 80° C., this may also be achieved, but with a longer time of cure, at room temperature. In the cooling step we prefer to operate at sub-zero temperatures, below 0° C., e.g. —10 to —20° C., but, as stated above, the temperature should not be so low that the half-shell becomes unduly brittle and cannot be handled.

In an alternative method (Method B) according to the invention, the core is coated without the aid of a mould by applying a liquid viscous curable polyurethane prepolymer to a core and continuing to apply the polyurethane until a coating of the desired thickness is applied but, again, interrupting curing before the polyurethane passes from the thermoplastic state into a non-thermoplastic state. Thus, for example, the core may be slowly rotated about a horizontal axis while being supported on a pair of supports each comprising one or more pins and viscous polyurethane pre-polymer applied to the core at right angles to the horizontal axis of the core until a coating of the desired thickness is built up. The polyurethane may thus, for example, be applied by an inclined chute (the surface of which is preferably of a non-adhesive nature, e.g. polytetrafluoroethylene), having an incurved delivery end conforming to the contour of the core. The thickness of the coating may be regulated by an appropriately positioned arcuate doctor blade. After the coating is applied the core is still slowly rotated until the coating sets by partial curing and by cooling, either at room temperature or by forced cooling. The coated core is then moulded in a patterned golf ball mould as described above.

The covered core may be converted into a golf ball by placing it in a patterned golf ball mould, e.g. of the compression type, where curing of the polyurethane is advanced to a non-thermoplastic state and the desired pattern is imparted to the cover. The time of cure will depend on the nature of the polyurethane and the temperature of cure but the conditions appropriate in any given case can readily be determined by simple experiment. The temperature should not be so high that the core is damaged.

Irrespective of whether the core is initially covered by moulding or coating, it is desirable to store the finally moulded ball e.g. by standing at room temperature for three days, to allow the cover to develop its full strength and hardness.

There will now be described, by way of example only, forms of apparatus suitable for carrying out the process according to the invention. Referring to the accompanying diagrammatic drawings:

FIG. I shows an injection mould assembly, in section, suitable for use in Method A;

FIG. II shows the lower half of the mould of FIG. I on an enlarged scale to show the structure of the wedge-shaped supports;

FIG. III shows a perspective view of apparatus suitable for use in Method B;

FIG. IV shows a detail of the apparatus as shown in FIG. III;

FIG. V shows an arrangement whereby various apparatus according to FIG. III can be utilized for larger scale production, and FIG. VI is a sectional view through a conventional compression type of golf ball mould suitable for performing the patterning step of Method A or Method B.

In FIG. I, the injection mould assembly comprises two mating die plate halves A and B defining internally a spheroid when assembled as shown inserted in a sleeve C. A, B and C are retained in position by annular plate D on the underside of C by means of threaded pins D'. The mould assembly is provided with a plunger E. Each half of the mould has three or more symmetrically disposed wedge-shaped supports G, as shown on an enlarged scale in FIG. II, in order to locate the core centrally in the mould. Care is taken to ensure that the end faces of the wedges are shaped to allow ready withdrawal of the coated core from the mould, i.e. the lower end faces are either vertical or point inward to the mould and the upper end faces are either vertical or point outward from the mould. Finally, the upper half A of the mould is provided with an injection orifice A' to permit transfer of polyurethane into the mould while the lower half B of the mould is provided with a spew hole B'.

It is not strictly necessary for there to be three wedges in each half of the mould so long as sufficient similarly spaced wedges are provided in the assembled mould to hold the core in a central position. In theory this can be achieved with a minimum of three symmetrically disposed wedges.

The use of the mould assembly in operation will be described in Example I below.

Referring to FIG. III, the apparatus comprises two assemblies of three pins (as at 2, one assembly not being shown because of the perspective view) adapted in operation to support a golf ball core (shown by dotted lines and indicated at 1) about its horizontal axis. The pin assemblies each comprise three (or more, if desired) pins mounted on a disc 3, attached to the ends of two rotating spindles 4, 4', of which 4 is driven by a shaft 5 through gears 6, 6'. The spindles 4, 4' are provided with bearings 7 mounted on rods 9 projecting from and rigidly mounted in side walls 10 of the apparatus. By means of a lever mechanism, not shown, the carriages 8 may be moved outwards against springs 11 thus causing spindle 4 to withdraw and disengage the drive. In order to supply the core with coating materials, there is provided adjacent to the core position an inclined chute 12, the lower end of which is incurved to conform to the contour of the core. Cup 13 directly below the coating apparatus has raising and lowering means (not shown) so that a core supported in the cup can be transferred therefrom to pin supporting means 2.

In operation, a core (which may be precoated as described above) is placed in cup 13 and raised into position between pin supports 2 held in a disengaged position by means of said lever, not shown. The core is then gripped in position and the driving means engaged. Polyurethane syrup is then passed down chute 12 in a controlled amount onto the slowly rotating core, the thickness of the applied coating being controlled by an arcuate doctor blade 23 shown in FIGURE IV at approximately 90° from the chute. After a coating of the desired thickness has been applied, the cutting is solidified or is allowed to solidify, depending on its pot-life and is then transferred to a conventional (compression-type) golf ball mould such as shown in FIG. VI where curing is completed and the desired pattern applied.

In FIG. VI is shown a conventional compression type golf ball mould for applying the desired pattern to the partially cured coated core. The coated core 1 is placed in mould H having mating halves 30 and 31. The inner surface of each of the mating halves 30 and 31 has a plurality of projections shown as 32 and 33 respectively, which imprint the desired pattern in the partially cured coating 34 on the coated ball core 1.

In FIG. V the apparatus is otherwise as described with reference to FIGS. III and IV except that several of the units of apparatus in FIG. III are driven from a common driving shaft and a special dispensing apparatus is provided for supplying coating material to the chutes 12.

The dispensing apparatus comprises a supply cylinder 14 provided with a nozzle 15. Coating composition in the cylinder is expelled through the nozzle 15 by a plunger 16, lateral movement of which is effected by racks 17 and pinions 18, the plunger being held vertical by rails 19 along which move guides 20. Movement of the plunger is in a stepped manner and in a vertical direction is controlled by a guide 21 and cam rails 22 consisting of alternate horizontal and inclined sections corresponding respectively to the distance between each chute 12, and the amount of coating composition to be expelled onto each chute from the cylinder 14 through the nozzle 15. The units are arranged in tandem so that the dispensing apparatus passes serially in a straight line from one to the next.

For the further understanding of the invention the following examples are given by way of illustration only:

METHOD A

Example I

A golf ball core was immersed for 5 minutes in 60% natural rubber latex, drained and dried in a current of warm air. It was then placed in the cavity between the two injection mould halves A and B (FIG. I) which were then inserted in the sleeve C, and the plate D screwed in position. All parts of the mould assembly were at 100° C.

Titanium dioxide (anatase) was dried at 140° C. for 1 hour. After drying, the titanium dioxide was allowed to cool to room temperature in a closed container. The titanium dioxide was then mixed with twice its weight of methylene bis (orthochloroaniline) (MOCA), as a cross-linking agent, and the mixture ball-milled for 24 hours to break down aggregates of titanium dioxide. The mixture of MOCA/titanium dioxide was transferred to a vessel which was then evacuated and heated, e.g. on an oil bath, to 140° C. The MOCA melted and dissolved gas was removed. The vacuum was released and the mixture stored in an oven at 110° C. in a sealed container. Immediately prior to use, the mixture was vigorously agitated to re-disperse the titanium dioxide in the liquid MOCA.

30 parts of the prepared MOCA/titanium dioxide mixture at 110° C. were added to 100 parts of a liquid polyurethane pre-polymer obtained from polytetrahydrofuran and tolylene diisocyanate, the pre-polymer being at room temperature and the mixture stirred vigorously. Exposure of the polyurethane pre-polymer to the atmosphere was kept to a minimum to avoid reaction with atmospheric moisture. The mixture was kept under vacuum for two minutes to eliminate dissolved gas.

To minimize pre-curing of the compounded syrup it was used as soon as possible, e.g. within 7 minutes of adding the MOCA to the polyurethane pre-polymer.

The degassed syrup was poured into the transfer cavity F of the mould of FIG. I and the plunger E, inserted. The mould was then inverted, and allowed to close under its own weight. The syrup surrounded the core and began to flow out of the spew hole B′ at the top into the hole in the plate D, when the mould assembly had closed, it was placed in an oven at 110° C., for 6.5 minutes. The mould assembly was then cooled with water to about 10° C., and the mould removed from the assembly and opened. The preformed ball, from which "sprues" had been removed, was then given a final press cure of 10 minutes at 100° C., in the conventional golf ball mould of FIG. VI which imprinted the lettering and pattern. The complete ball showed no signs of support marks or excrescences. Tests showed it to have superior cutting resistance to that of a standard gutta percha-covered ball. The ball was sectioned and it was found that the polyurethane coating was of uniform thickness and had excellent adhesion to the core.

METHOD A

Example II

PRECOATING

The apparatus illustrated in FIGURES III and IV was used.

A previously made golf ball core was located between the pins 2 by means of the cup 13 in such a way that a diameter of the core coincided with the axis of rotation. Rotation of the core was then set in motion at approximately 20 r.p.m. The doctor blade 23 was arranged to touch the surface of the rotating core lightly.

100 parts by weight of Adiprene L.167(a) were stirred with 10 parts by weight of Visco 699(b) and the syrupy mixture poured down the chute 12 on to the rotating ball. Rotation was continued for approximately 2 minutes, by which time the core was thinly and evenly coated. The doctor blade was then removed. The apparatus was then placed in an oven maintained at 40° C. and rotation continued for a further 5 minutes, during which time the coating material set to an elastomeric film.

(a) A polytetrahydrofuran/tolylene diisocyanate prepolymer made by E. I. du Pont de Nemours & Co. (U.S.A.).

(b) Trihydroxypropyl monohydroxyethylene diamine made by Visco Products Co. (U.S.A.).

MOULDING

All parts of the injection mould (FIGURE I) were heated to 100° C. The precoated core was then mounted within the two half cavities (parts A and B), which were then inserted in sleeve C, and plate D screwed in position.

The polyurethane composition to be used for the golf ball cover had already been prepared in the following way:

10 parts by weight of titanium dioxide were dispersed in 10 parts by weight of Desmophen 2000(c) by grinding in a paint mill, and the resulting dispersion added to 90 parts by weight of Desmophen 2000 in a stainless steel autoclave. The mixture was heated and stirred for 2 hours at 130° C., under vacuum of 2 cm. Hg, 28 parts by weight of naphthalene 1:5-diisocyanate were then added and the mixture stirred for 10 minutes at 130° C., vacuum being applied during the last 8 minutes to remove any dissolved gas. 6.2 parts by weight of butane diol (slightly acidified with anhydrous HCl) were then added and the mixture briefly stirred.

The hot syrupy composition was immediately poured into the transfer cavity (F) of the mould and the plunger (E) inserted. The remainder of the moulding operation was carried out as described in Example I, the cure time being 10 minutes at 110° C. The mould was cooled with water to 10° C. and the coated core removed.

After having been trimmed, the preformed ball was finally press cured for 10 minutes at 100° C. as described in Example I.

(c) A hydroxyl-terminated polyethylene glycol adipate of approx. 1850 m. wt. made by Farbenfabriken Bayer A.G. (Germany).

*Example III*

A previously made golf ball core was immersed for 5 minutes in a prevulcanized natural rubber latex of 60% rubber content, allowed to drain, and dried in a current of warm air. The coated core was then placed in the apparatus illustrated in FIGURE III in the manner described in Example II. The doctor blade 23 was adjusted to a distance of 0.05" from the surface of the core and the apparatus set in motion so as to rotate the core at 20 r.p.m.

To 100 parts by weight of liquid polyurethane prepolymer Adiprene L.167 (having a temperature of approximately 23° C.) were added with stirring 30 parts by weight of MOCA/titanium dioxide mixture (prepared as described in Example I and heated to 110° C.). Stirring was continued and vacuum applied for 2 minutes to remove dispersed air.

The composition prepared in this way was poured down the chute 12 of the apparatus. After approximately 5 minutes rotation, the core had been smoothly coated and the doctor blade was then withdrawn. The speed of rotation of the ball was then increased to approximately 60 r.p.m. and the apparatus transferred to an oven maintained at 100° C. After 10 minutes heating, the apparatus was cooled rapidly in a stream of air. Rotation was stopped when the coated core was cool enough to be handled without damage.

The coated core was then press cured for 10 minutes at 110° C. in the conventional golf ball mould of FIG. VI as described in Examples I and II.

We claim:

1. A process for the manufacture of balls which comprises supporting a preformed ball core; forming an integral, unpatterned solid cover thereon by applying to said supported core, a viscous liquid curable polyurethane pre-polymer and partially curing said polyurethane until the cover is solid but still substantially thermoplastic; cooling said cover to a temperature at which further curing of the polyurethane is inhibited; transferring said partially cured coated core to a ball mould provided with a patterned moulding surface and moulding the coated core to a patterned ball therein while simultaneously further curing the polyurethane to a substantially non-thermoplastic state.

2. A process for the manufacture of balls which comprises supporting a preformed ball core in a mould provided with supports rigidly connected to the mould for centrally positioning the core therein; forming an integral, unpatterned solid cover thereon by moulding a viscous liquid curable polyurethane prepolymer around said supported core and partially curing said polyurethane until the cover is solid but still substantially thermoplastic; cooling said cover to a temperature at which further curing of the polyurethane is inhibited; transferring said partially cured coated core to a ball mould provided with a patterned moulding surface and moulding the coated core to a patterned ball therein while simultaneously further curing the polyurethane to a substantially non-thermoplastic state.

3. A process for the manufacture of balls which comprises supporting a preformed ball core in a mould provided with supports rigidly connected to the mould for centrally positioning the core therein; forming an integral, unpatterned solid cover thereon by injection moulding a viscous liquid curable polyurethane pre-polymer around said supported core and partially curing said polyurethane until the cover is solid but still substantially thermoplastic; interrupting curing of said polyurethane by cooling the cover while still in a plastic state to a temperature below the freezing point of the polymer; transferring the frozen coated core to a ball mould provided with a patterned moulding surface and moulding the coated core to a patterned ball therein while simultaneously further curing the polyurethane to a substantially non-thermoplastic state.

References Cited by the Examiner

UNITED STATES PATENTS

| | | | |
|---|---|---|---|
| 1,146,523 | 7/15 | Roberts | 18—59 |
| 1,930,167 | 10/33 | Goodwin | 18—59 |
| 2,117,400 | 5/38 | Cobb | 18—59 X |
| 2,376,085 | 5/45 | Radford et al. | 18—59 X |
| 2,405,802 | 8/46 | Taber | 18—59 |
| 2,507,496 | 5/50 | Bond | 18—59 |
| 2,604,661 | 7/52 | Karns | 18—36 |
| 2,677,149 | 5/54 | Fineran | 18—36 X |
| 2,743,931 | 5/56 | Pooley et al. | 18—59 |
| 3,034,791 | 5/62 | Gallagher. | |

ROBERT F. WHITE, *Primary Examiner.*

WILLIAM J. STEPHENSON, MORRIS LIEBMAN, ALEXANDER H. BRODMERKEL, *Examiners.*